United States Patent
Cereghini et al.

(10) Patent No.: US 6,687,693 B2
(45) Date of Patent: Feb. 3, 2004

(54) ARCHITECTURE FOR DISTRIBUTED RELATIONAL DATA MINING SYSTEMS

(75) Inventors: Paul Marcelo Cereghini, Escondido, CA (US); Scott Woodroofe Cunningham, Mountain view, CA (US)

(73) Assignee: NCR Corporation, Dayton, OH (US)

( * ) Notice: Subject to any disclaimer, the term of this patent is extended or adjusted under 35 U.S.C. 154(b) by 226 days.

(21) Appl. No.: 09/739,993

(22) Filed: Dec. 18, 2000

(65) Prior Publication Data

US 2002/0078039 A1 Jun. 20, 2002

(51) Int. Cl.[7] .............................................. G06F 17/30
(52) U.S. Cl. ............................................ 707/6; 707/10
(58) Field of Search ................................ 707/1, 2, 3, 4, 707/5, 6, 100, 101, 102, 104.1, 10, 200; 706/16

(56) References Cited

U.S. PATENT DOCUMENTS

| | | | |
|---|---|---|---|
| 5,566,330 A | * 10/1996 | Sheffield | 707/4 |
| 5,761,656 A | * 6/1998 | Ben-Shachar | 345/769 |
| 5,787,425 A | 7/1998 | Bigus | |
| 5,909,681 A | 6/1999 | Passera et al. | |
| 5,970,482 A | * 10/1999 | Pham et al. | 706/12 |
| 6,385,604 B1 | * 5/2002 | Bakalash et al. | 707/10 |
| 6,408,292 B1 | * 6/2002 | Bakalash et al. | 707/100 |
| 6,418,450 B2 | * 7/2002 | Daudenarde | 707/10 |

OTHER PUBLICATIONS

Microsoft Computer Dictionary, p. 144.*
C. Aggarwal et al., "Fast Algorithms for Projected Clustering," In Proceedings of the ACM SIGMOD Int'l Conf on Management of Data, Philadelphia, PA, 1999.
R. Agrawal et al., "Automatic Subspace Clustering of High . . . Applications," In Proceedings of ACM SIGMOD Int'l Conf on Management of Data, Seattle, WA, 1998.
H. Bozdogan, "Model selection and Akaike's information criterion . . . extensions," Psychometrika, 52(3):345–370, 1987.
P.S. Bradley et al., "Scaling Clustering Algorithms to Large Databases," In Proceedings of the Int'l Knowledge Discovery and Data Mining Conference (KDD), 1998.
P.S. Bradley et al., "Scaling EM (Expectation–Maximization) Clustering to Large Databases," Microsoft Research Technical Report, 20 pages, 1998.
A.P. Dempster et al., "Maximum Likelihood from Incomplete Data via the EM Algorithm," Journal of The Royal Statistical Society, 39(1):1–38, 1977.

(List continued on next page.)

Primary Examiner—Diane D. Mizrahi
(74) Attorney, Agent, or Firm—Gates & Cooper LLP

(57) ABSTRACT

A computer-implemented data mining system includes an Interface Tier, an Analysis Tier, and a Database Tier. The Interface Tier supports interaction with users, and includes an On-Line Analytic Processing (OLAP) Client that provides a user interface for generating SQL statements that retrieve data from a database, and an Analysis Client that displays results from a data mining algorithm. The Analysis Tier performs one or more data mining algorithms, and includes an OLAP Server that schedules and prioritizes the SQL statements received from the OLAP Client, an Analytic Server that schedules and invokes the data mining algorithm to analyze the data retrieved from the database, and a Learning Engine performs a Learning step of the data mining algorithm. The Database Tier stores and manages the databases, and includes an Inference Engine that performs an Inference step of the data mining algorithm, a relational database management system (RDBMS) that performs the SQL statements against a Data Mining View to retrieve the data from the database, and a Model Results Table that stores the results of the data mining algorithm.

39 Claims, 2 Drawing Sheets

OTHER PUBLICATIONS

M. Ester et al., "A Density–Based Algorithm for Discovering . . . Noise," In Proceedings of the IEEE, Int'l Conf on Data Engineering (ICDE), Portland, Oregon, 1996.

G. Graefe et al., "On the Efficient Gathering . . . Databases," Microsoft, AAAI, 5 pages, 1998.

A. Hinneburg et al., "Optimal Grid–Clustering: Towards Breaking the Curse . . . Clustering," In Proceedings of the $25^{th}$ Int'l Conf on Very Large Data Bases, Edinburgh, Scotland, 1999.

M.I. Jordan et al., "Hierarchical Mixtures of Experts and the EM Algorithm," Neural Computation, 6:181–214, 1994.

F. Murtagh, "A Survey of Recent Advances in Hierarchical Clustering Algorithms," The Computer Journal, 26(4):354–359, 1983.

R.T. Ng et al., "Efficient and Effective Clustering Methods . . . Mining," In Proc. of the VLDB Conf, Santiago, Chile, 1994.

W.H. Press et al., "Numerical Recipes in C," Cambridge University Press: Cambridge, 20 pgs., 1986.

S. Roweis, "A Unifying Review of Linear Gaussian Models," Neural Computation, 11:305–345, 1999.

T. Zhang et al., "BIRCH: An Efficient Data Clustering . . . Databases," Int'l Proc of the ACM SIGMOD Conference, Montreal, Canada, pp. 103–114, 1996.

A White Paper Prepared by MicroStrategy, Inc., "The Case for Relational OLAP," 20 pages, 1995.

* cited by examiner

ARCHITECTURE FOR DISTRIBUTED RELATIONAL DATA MINING SYSTEMS

CROSS REFERENCE TO RELATED APPLICATIONS

This application is related to the following co-pending and commonly assigned patent applications:

Pending application Ser. No. 09/739,491, filed on same date herewith, by Mikael Bisgaard-Bohr and Scott W. Cunningham, and entitled "ANALYSIS OF RETAIL TRANSACTIONS USING GAUSSIAN MIXTURE MODELS IN A DATA MINING SYSTEM,";

Pending application Ser. No. 09/739,994 filed on same date herewith, by Mikael Bisgaard-Bohr and Scott W. Cunningham, and entitled "DATA MODEL FOR ANALYSIS OF RETAIL TRANSACTIONS USING GAUSSIAN MIXTURE MODELS IN A DATA MINING SYSTEM,"; and application Ser. No. 09/740,119 filed on same date herewith, by Scott W. Cunningham, and entitled "IMPROVEMENTS TO GAUSSIAN MIXTURE MODELS IN A DATA MINING SYSTEM,";

all of which applications are incorporated by reference herein.

BACKGROUND OF THE INVENTION

1. Field of the Invention

This invention relates to data mining systems, and in particular, to an architecture for distributed relational data mining systems.

2. Description of Related Art

Often, computer-implemented systems are used to analyze commercial and financial transaction data. In many instances, such data is analyzed to gain a better understanding of customer behavior by analysis of customer transactions.

Prior art methods for analyzing customer transactions often involve one or more of the following techniques:

1. Ad hoc querying: This methodology involves the iterative analysis of transaction data by human effort, using querying languages such as SQL.
2. On-line Analytical Processing (OLAP): This methodology involves the application of automated software front-ends that automate the querying of relational databases storing transaction data and the production of reports therefrom.
3. Statistical packages: This methodology requires the sampling of transaction data, the extraction of the data into flat file or other proprietary formats, and the application of general purpose statistical or data mining software packages to the data.

However, these prior techniques have serious shortcomings that represent significant impediments to their use and important flaws in the design of analytical architectures. Of key importance is that prior art techniques do not work well with large databases, because such schemes do not consider memory limitations and do not account for large data sets. Thus, there is a need in the art for improved techniques for implementing data mining systems, especially architectures that handle large amounts of data.

SUMMARY OF THE INVENTION

A computer-implemented data mining system includes an Interface Tier, an Analysis Tier, and a Database Tier. The Interface Tier supports interaction with users, and includes an On-Line Analytic Processing (OLAP) Client that provides a user interface for generating SQL statements that retrieve data from a database, and an Analysis Client that displays results from a data mining algorithm. The Analysis Tier performs one or more data mining algorithms, and includes an OLAP Server that schedules and prioritizes the SQL statements received from the OLAP Client, an Analytic Server that schedules and invokes the data mining algorithm to analyze the data retrieved from the database, and a Learning Engine performs a Learning step of the data mining algorithm. The Database Tier stores and manages the databases, and includes an Inference Engine that performs an Inference step of the data mining algorithm, a relational database management system (RDBMS) that performs the SQL statements against a Data Mining View to retrieve the data from the database, and a Model Results Table that stores the results of the data mining algorithm.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The architecture of the present invention can be used to implement high-volume analysis of a variety of probabilistic models within a relational database framework. Such an architecture supports decision-making within a variety of informational and organizational structures. Moreover, the architecture allows wide customization in the input, analysis and reporting of data mining models. The architecture speeds the preprocessing and transformation of data. The architecture also efficiently supports a variety of data mining models, supports on-line updates to models, and supports incremental analysis of data. In addition, the architecture allows for the effective summarization of model parameters, enabling the distribution and the re-use of the mining results.

Hardware and Software Environment

Figure 1:
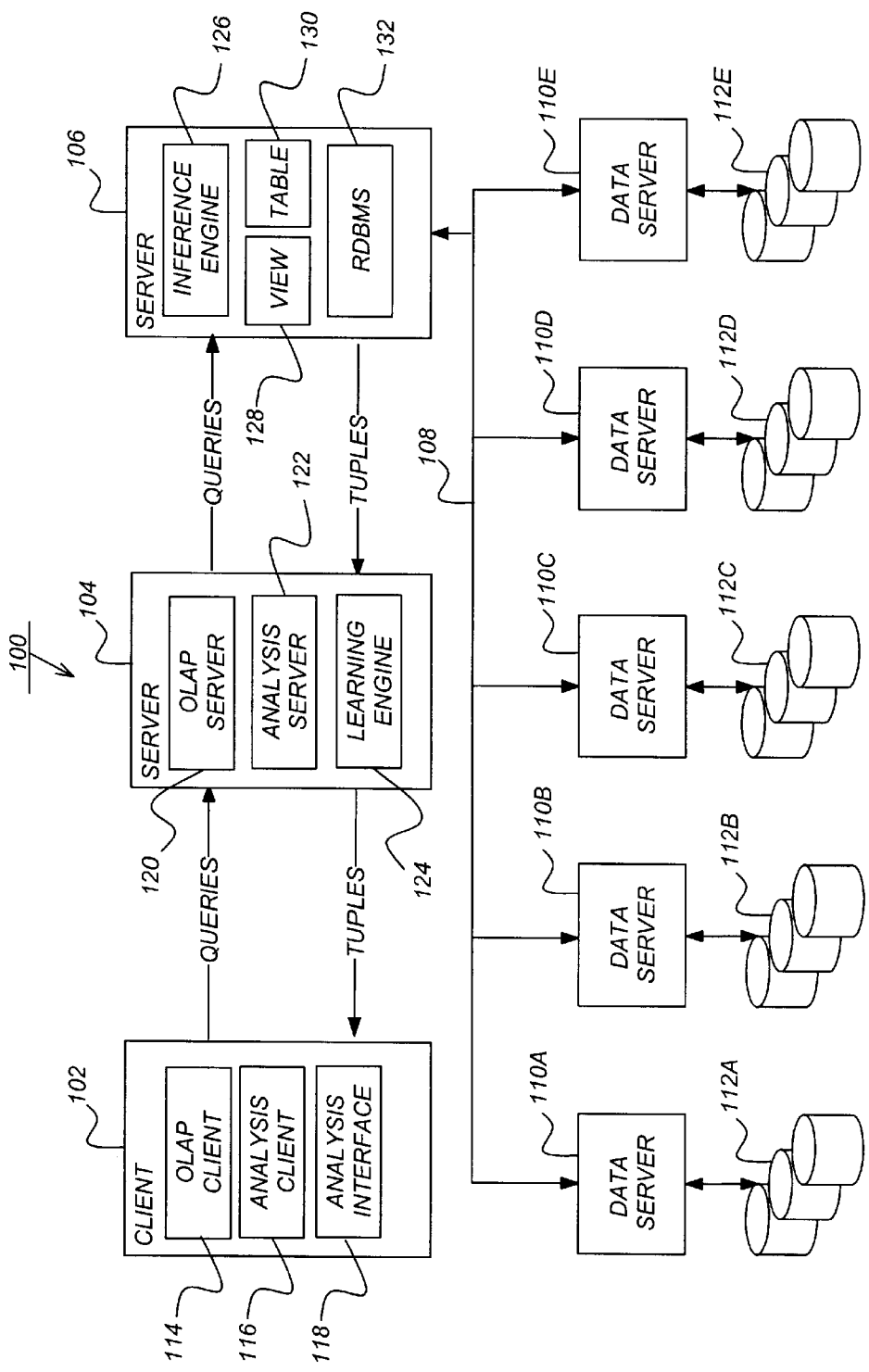
FIG. 1 illustrates an exemplary hardware and software environment that could be used with the present invention.

FIG. 1 illustrates an exemplary hardware and software environment that could be used with the present invention. In the exemplary environment, a computer system 100 implements a data mining system in a three-tier client-server architecture comprised of a first client tier 102, a second server tier 104, and a third server tier 106. In the preferred embodiment, the third server tier 106 is coupled via a network 108 to one or more data servers 110A–110E storing a relational database on one or more data storage devices 112A–112E.

The client tier 102 comprises an Interface Tier for supporting interaction with users, wherein the Interface Tier includes an On-Line Analytic Processing (OLAP) Client 114 that provides a user interface for generating SQL statements that retrieve data from a database, an Analysis Client 116 that displays results from a data mining algorithm, and an Analysis Interface 118 for interfacing between the client tier 102 and server tier 104.

The server tier 104 comprises an Analysis Tier for performing one or more data mining algorithms, wherein the Analysis Tier includes an OLAP Server 120 that schedules and prioritizes the SQL statements received from the OLAP Client 114, an Analysis Server 122 that schedules and invokes the data mining algorithm to analyze the data retrieved from the database, and a Learning Engine 124 performs a Learning step of the data mining algorithm. In the preferred embodiment, the data mining algorithm comprises an Expectation-Maximization procedure that creates a Gaussian Mixture Model using the results returned from the queries.

The server tier 106 comprises a Database Tier for storing and managing the databases, wherein the Database Tier includes an Inference Engine 126 that performs an Inference step of the data mining algorithm, a relational database management system (RDBMS) 132 that performs the SQL statements against a Data Mining View 128 to retrieve the data from the database, and a Model Results Table 130 that stores the results of the data mining algorithm.

The RDBMS 132 interfaces to the data servers 110A–110E as mechanism for storing and accessing large relational databases. The preferred embodiment comprises the Teradata® RDBMS, sold by NCR Corporation, the assignee of the present invention, which excels at high volume forms of analysis. Moreover, the RDBMS 132 and the data servers 110A–110E may use any number of different parallelism mechanisms, such as hash partitioning, range partitioning, value partitioning, or other partitioning methods. In addition, the data servers 110 perform operations against the relational database in a parallel manner as well.

Generally, the data servers 110A–110E, OLAP Client 114, Analysis Client 116, Analysis Interface 118, OLAP Server 120, Analysis Server 122, Learning Engine 124, Inference Engine 126, Data Mining View 128, Model Results Table 130, and/or RDBMS 132 each comprise logic and/or data tangibly embodied in and/or accessible from a device, media, carrier, or signal, such as RAM, ROM, one or more of the data storage devices 112A–112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

For example, the 3-tier architecture of the preferred embodiment could be implemented on 1, 2, 3 or more independent machines. The present invention is not restricted to the hardware environment shown in FIG. 1.

Operation of the Data Mining System

Figure 2:
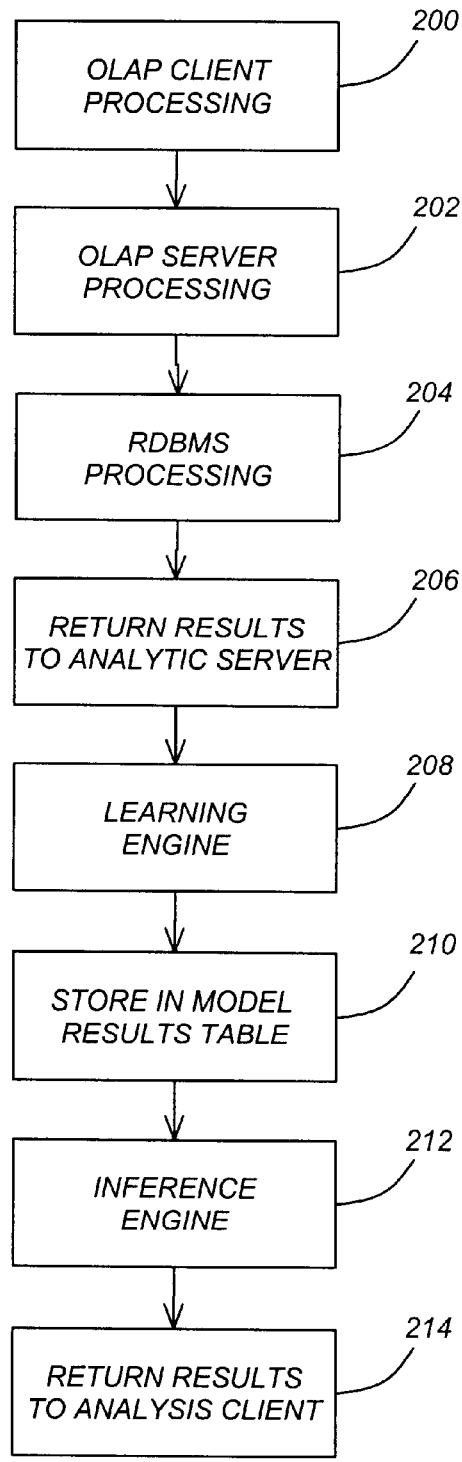
FIG. 2 is a flowchart that illustrates the logic of the preferred embodiment of the present invention.

FIG. 2 is a flow chart illustrating the steps necessary for the interpretation and execution of queries or other user interactions, either in a batch environment or in an interactive environment, according to the preferred embodiment of the present invention.

Block 200 represents the OLAP Client 114 processing, which incorporates a number of OLAP tools that provide a user-friendly way of querying databases and of automating reports. Specifically, the OLAP Client 114 provides a user interface of these tools, converting the users interaction with the graphical user interface (GUI) into SQL statements for use in querying relational databases. Consequently, the OLAP Client 114 mediates human knowledge with machine procedures encoded in the form of SQL. The OLAP Client 114 can also optimize the SQL statements to run more efficiently. The SQL statements use metadata retrieved from the RDBMS 132 to assist in the formulation of these SQL statements, wherein the metadata describes the structure of the relational database, the kinds of variables contained in the data, and the names of database variables and tables.

Block 202 represents the OLAP Server 120 processing, which schedules and prioritizes the SQL statements received from the OLAP Client 114 for execution by the RDBMS 132 against the relational database. Like the OLAP Client 114, the OLAP Server 120 often optimizes these SQL statements, ensuring that they execute as efficiently as possible. Also, like the OLAP Client 114, the OLAP Server 120 uses metadata retrieved from the RDBMS 132 to assist in this process.

Block 204 represents the RDBMS 132 performing the SQL statements against the Data Mining View 128 to retrieve the desired data. The Data Mining View 128 provides customized views of relational tables for data mining and analysis, and can perform an optimal normalization of the databases. The View 128 also ensures that the variables selected by the SQL statements are conceptually valid.

Block 206 represents results from correctly formatted queries against the database 112 being returned to the Analytic Server 122 or the Analysis Client 116. Query results returned to the Analytic Server 122 are used in the scheduling and analysis of the data mining algorithms. The data mining algorithms generally are comprised of two steps, i.e., Learning and Inference steps. The Learning step is performed by the Learning Engine 124 to discover new information or patterns in the query results returned from the databases. The Inference step is performed by the Inference Engine 126 to apply learning to new or unseen data found in the query results returned from the databases.

Block 208 represents the Learning Engine 124 invoking one of a variety of probabilistic models or graphical models implemented therein. Specifically, the Learning Engine 124 utilizes an estimation procedure known as Expectation-Maximization, which is extremely flexible, thereby allowing a range of data mining models to be estimated from a common core of analytic code.

More information on Expectation-Maximization can be found in the co-pending and commonly assigned pending application Ser. No. 09/739,339 filed on same date herewith, by Mikael Bisgaard-Bohr and Scott W. Cunningham, and entitled "ANALYSIS OF RETAIL TRANSACTIONS USING GAUSSIAN MIXTURE MODELS IN A DATA MINING SYSTEM,", pending application Ser. No. 09/739,994 filed on same date herewith, by Mikael Bisgaard-Bohr and Scott W. Cunningham, and entitled "DATA MODEL FOR ANALYSIS OF RETAIL TRANSACTIONS USING GAUSSIAN MIXTURE MODELS IN A DATA MINING SYSTEM,", and pending application Ser. No. 09/740,119 filed on same date herewith, by Scott W. Cunningham, and entitled "IMPROVEMENTS TO GAUSSIAN MIXTURE MODELS IN A DATA MINING SYSTEM,", both of which applications are incorporated by reference herein.

Block 210 represents the output from the Learning Engine 124 being stored in the Model Results Table 130, which is used to warehouse the result of data mining analyses. Note that the architecture also supports the analysis of text, tab, or comma-separated formats of flat files, in addition to analysis of relational databases. Moreover, data from the relational database may be exported in small increments, thereby allowing analytical models to be produced and updated as new data becomes available.

More information on the data models (e.g., a Gaussian Mixture Model) can be found in the co-pending and commonly assigned pending application Ser. No. 09/739,991 filed on same date herewith, by Mikael Bisgaard-Bohr and Scott W. Cunningham, and entitled "ANALYSIS OF RETAIL TRANSACTIONS USING GAUSSIAN MIXTURE MODELS IN A DATA MINING SYSTEM,", pending application Ser. No. 09/739,994 filed on same date herewith, by Mikael Bisgaard-Bohr and Scott W. Cunningham, and entitled "DATA MODEL FOR ANALYSIS OF RETAIL TRANSACTIONS USING GAUSSIAN MIXTURE MODELS IN A DATA MINING SYSTEM, "pending application Ser. No. 09/740,119 filed on same date herewith, by Scott W. Cunningham, and entitled "IMPROVEMENTS TO GAUSSIAN MIXTURE MODELS IN A DATA MINING SYSTEM," attorneys' docket number 9143, both of which applications are incorporated by reference herein.

Block 212 represents the Inference Engine 126 accessing the results of the model produced by the Learning Engine 124 and stored in the Model Results Table 130, which is sometimes constructed on a sample, and then scoring the results. The output from the Inference Engine 126 may also be stored in the Model Results Table 130.

Block 214 represents the end result of this processing being returned to the Analysis Client 116. (Query results may also be returned to Analysis Client 116). The Analysis Client 116 presents the user with a customized graphical user interface, allowing specific screens for data mining input and for displaying the results from a specific algorithm.

Conclusion

This concludes the description of the preferred embodiment of the invention. The following paragraphs describe some alternative embodiments for accomplishing the same invention.

In one alternative embodiment, any type of computer could be used to implement the present invention. In addition, any database management system, decision support system, on-line analytic processing system, or other computer program that performs similar functions could be used with the present invention.

In summary, the present invention discloses a computer-implemented data mining system includes an Interface Tier, an Analysis Tier, and a Database Tier. The Interface Tier supports interaction with users, and includes an On-Line Analytic Processing (OLAP) Client that provides a user interface for generating SQL statements that retrieve data from a database, and an Analysis Client that displays results from a data mining algorithm. The Analysis Tier performs one or more data mining algorithms, and includes an OLAP Server that schedules and prioritizes the SQL statements received from the OLAP Client, an Analytic Server that schedules and invokes the data mining algorithm to analyze the data retrieved from the database, and a Learning Engine performs a Learning step of the data mining algorithm. The Database Tier stores and manages the databases, and includes an Inference Engine that performs an Inference step of the data mining algorithm, a relational database management system (RDBMS) that performs the SQL statements against a Data Mining View to retrieve the data from the database, and a Model Results Table that stores the results of the data mining algorithm.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented data mining system, comprising:
    (a) an Interface Tier for supporting interaction with users, wherein the Interface Tier includes an On-Line Analytic Processing (OLAP) Client that provides a user interface for generating SQL statements that retrieve data from a database, and an Analysis Client that displays results from a data mining algorithm;
    (b) an Analysis Tier for performing one or more data mining algorithms, wherein the Analysis Tier includes an OLAP Server that schedules and prioritizes the SQL statements received from the OLAP Client, an Analytic Server that schedules and invokes the data mining algorithm to analyze the data retrieved from the database, and a Learning Engine that performs a Learning step of the data mining algorithm; and
    (c) a Database Tier for storing and managing the databases, wherein the Database Tier includes an Inference Engine that performs an Inference step of the data mining algorithm, a relational database management system (RDBMS) that performs the SQL statements against a Data Mining View to retrieve the data from the database, and a Model Results Table that stores results from the data mining algorithm.

2. The data mining system of claim 1, wherein the Interface Tier converts the user's interaction with a graphical user interface (GUI) into SQL statements for use in querying the database.

3. The data mining system of claim 2, wherein the Interface Tier optimizes the SQL statements.

4. The data mining system of claim 2, wherein the Analysis Tier optimizes the SQL statements using metadata retrieved from the Database Tier.

5. The data mining system of claim 1, wherein the data mining algorithm is comprised of Learning and Inference steps, the Learning step is performed by the Learning Engine to discover new patterns in the databases, and the Inference step is performed by the Inference Engine to apply learning against new data.

6. The data mining system of claim 5, wherein the Learning Engine invokes one or more probabilistic models implemented therein.

7. The dart mining system of claim 5, wherein the Learning Engine invokes one or more graphical models implemented therein.

8. The data mining system of claim 5, wherein results from the Learning Engine are stored in the Model Results Table.

9. The data mining system of claim 8, wherein the Inference Engine accesses the results from the Learning Engine stored in the Model Results Table.

10. The data mining system of claim 9, wherein results from the Inference Engine are stored in the Model Results Table.

11. The data mining system of claim 1, wherein the Database Tier performs the queries against the Data Mining View, and the Data Mining View provides a customized view of the databases for data mining and analysis.

12. The data mining system of claim 11, wherein the Data Mining View performs an optimal normalization of the databases.

13. The data mining system of claim 11, wherein the Data Mining View ensures that variables selected are conceptually valid.

14. A computer-implemented method for data mining, comprising:
  (a) supporting interaction with users in an Interface Tier, wherein the Interface Tier includes an On-Line Analytic Processing (OLAP) Client that provides a user interface for generating SQL statements that retrieve data from a database, and an Analysis Client that displays results from a data mining algorithm;
  (b) performing one or more data mining algorithms in an Analysis Tier, wherein the Analysis Tier includes art OLAP Server that schedules and prioritizes the SQL statements received from the OLAP Client; an Analytic Server that schedules and invokes the data mining algorithm to analyze the data retrieved from die database, and a Learning Engine that performs a Learning step of the data mining algorithm; and
  (c) storing and managing the databases in a Database Tier, wherein the Database Tier includes an Inference Engine that performs an Inference step of the data mining algorithm, a relational database management system (RDBMS) that performs the SQL statements against a Data Mining View to retrieve the data from the database, and a Model Results Table that stores results from the data mining algorithm.

15. The method of claim 14, wherein the supporting step (a) further comprises converting the user's interaction with a graphical user interface (GUI) into SQL statements for use in querying the databases.

16. The method of claim 15, wherein the supporting step (a) further comprises optimizing die SQL statements.

17. The method of claim 15, wherein the performing step (b) further comprises optimizing the SQL statements using metadata retrieved from the Database Tier.

18. The method of claim 14, wherein the data mining algorithm is comprised of Learning and Inference steps, the Learning step is performed by the Learning Engine to discover new patterns in the databases, and the Inference step is performed by the Inference Engine to apply learning against new data.

19. The method of claim 18, wherein the Learning Engine invokes one or more probabilistic models implemented therein.

20. The method of claim 18, wherein the Learning Engine invokes one or more graphical models implemented therein.

21. The method of claim 18, wherein results from the Learning Engine are scored in the Model Results Table.

22. The method of claim 21, wherein the Inference Engine accesses the results from the Learning Engine stored in die Model Results Table.

23. The method of claim 21, wherein results from the Inference Engine are stored in the Model Results Table.

24. The method of claim 14, wherein the storing and managing step (c) further comprises performing the queries against the Data Mining View, and the Data Mining View provides a customized view of the databases for data mining and analysis.

25. The method of claim 24, wherein the Darn Mining View performs an optimal normalization of the databases.

26. The method of claim 24, wherein the Data Mining View ensures that variables selected are conceptually valid.

27. An article of manufacture embodying logic for data mining in a computer-implemented system, the logic comprising:
  (a) supporting interaction with users in an Interface Tier, wherein the Interface Tier includes an On-Line Analytic Processing (OLAP) Client that provides a user interface for generating SQL statements that retrieve data from a database, and an Analysis Client that displays results from a data mining algorithm;
  (b) performing one or more data mining algorithms in an Analysis Tier, wherein the Analysis Tier includes an OLAP Server that schedules and prioritizes the SQL statements received from the OLAP Client, an Analytic Saver that schedules and invokes the data mining algorithm to analyze the data retrieved from the database, and a Learning Engine that performs a Learning step of the data mining algorithm; and
  (c) scoring and managing the databases in a Database Tier, wherein the Database Tier includes an Inference Engine that performs an Inference step of the data mining algorithm, a relational database management system (RDBMS) that performs the SQL statements against a Data Mining View to retrieve the data from the database, and a Model Results Table that stores results from the data mining algorithm.

28. The article of manufacture of claim 27, wherein the supporting step (a) further comprises converting the user's interaction with a graphical user interface (GUI) into SQL statements for use in querying the databases.

29. The article of manufacture of claim 28, wherein the supporting step (a) further comprises optimizing the SQL statements.

30. The article of manufacture of claim 28, wherein the performing step (b) further comprises optimizing the SQL statements using metadata retrieved from the Database Tier.

31. The article of manufacture of claim 27, wherein the data mining algorithm is comprised of Learning and Inference steps, the Learning step is performed by the Learning Engine to discover new patterns in the databases, and the Inference step is performed by the Inference Engine to apply learning against new data.

32. The article of manufacture of claim 31, wherein the Learning Engine invokes one or more probabilistic models implemented therein.

33. The article of manufacture of claim 31, wherein the Learning Engine invokes one or more graphical models implemented therein.

34. The article of manufacture of claim 31, wherein results from the Learning Engine are stored in the Model Results Table.

35. The article of manufacture of claim 34, wherein the Inference Engine accesses the results from the Learning Engine stored in the Model Results Table.

36. The article of manufacture of claim 34, wherein results from the Inference Engine are stored in the Model Results Table.

37. The article of manufacture of claim 27, wherein the storing and managing step (c) further comprises performing the queries against the Data Mining View, and the Data Mining View provides a customized view of the databases for data ruining and analysis.

38. The article of manufacture of claim 37, wherein the Data Mining View performs an normalization of the databases.

39. The article of manufacture of claim 37, wherein the Data Mining View ensures that variables selected are conceptually valid.

* * * * *

UNITED STATES PATENT AND TRADEMARK OFFICE
CERTIFICATE OF CORRECTION

PATENT NO. : 6,687,693 B2
DATED : February 3, 2004
INVENTOR(S) : Cereghini, P. and Cunningham, S.

It is certified that error appears in the above-identified patent and that said Letters Patent is hereby corrected as shown below:

<u>Column 6,</u>
Line 44, delete "database" and insert -- databases --

Signed and Sealed this

Eighteenth Day of January, 2005

JON W. DUDAS
*Director of the United States Patent and Trademark Office*